(12) United States Patent
Kawakubo et al.

(10) Patent No.: US 6,447,004 B1
(45) Date of Patent: Sep. 10, 2002

(54) INSTRUMENT PANEL FOR AIR BAG DEVICE, AND PROCESS FOR MANUFACTURING THE SAME

(75) Inventors: Yasushi Kawakubo; Shiro Ozaki, both of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/116,003

(22) Filed: Jul. 15, 1998

(30) Foreign Application Priority Data

Jul. 16, 1997 (JP) .............................................. 9-208648

(51) Int. Cl.⁷ .......................... B60R 21/16; B60R 21/20
(52) U.S. Cl. ...................................... 280/728.3; 280/732
(58) Field of Search ................................ 280/728.3, 732

(56) References Cited

U.S. PATENT DOCUMENTS

| | | | | |
|---|---|---|---|---|
| 5,238,264 A | * | 8/1993 | Barnes ........................ | 280/732 |
| 5,425,550 A | * | 6/1995 | Paxton et al. ............. | 280/728.3 |
| 5,700,028 A | * | 12/1997 | Logan et al. ............. | 280/728.3 |
| 5,810,389 A | * | 9/1998 | Yamaji et al. ........... | 280/728.3 |

* cited by examiner

Primary Examiner—Paul N. Dickson
Assistant Examiner—Matthew Luby
(74) Attorney, Agent, or Firm—Jordan and Hamburg LLP

(57) ABSTRACT

An instrument panel for an air bag device has a surface member having a first surface component and a second surface component each with backsides. A foamed member is formed on the back sides of the surface member and cleavable by expanding pressure of an air bag of the air bag device where the air bag device is disposed adjacent the foam member. The first surface component and the second surface component respectively having first and second side edge portions with respective first and second engaging portions engaging one another to form an adjoining portion of the surface member whereat the surface member is cleaved by the expanding pressure of the air bag. The first engaging portion included a fitting groove having a generally U-shaped section extending from the backside of the first surface component into the foamed member. The second engaging portion includes a fitting protrusion extending from the backside of the second surface component and adapted to be inserted into the fitting groove. The foamed member is foamed onto the backside of the surface member with the fitting protrusion inserted into the fitting groove such that the fitting groove with the fitting protrusion inserted therein is embedded in the foamed member.

2 Claims, 6 Drawing Sheets

INSTRUMENT PANEL FOR AIR BAG DEVICE, AND PROCESS FOR MANUFACTURING THE SAME

BACKGROUND OF THE INVENTION

The present invention relates to an instrument panel having a built-in instrument panel for an air bag device and, more particularly, to an instrument panel having an air bag door formed integrally and a process for manufacturing the instrument panel.

An air bag device is a device for restraining a vehicular passenger by inflating an air bag. The air bag device is ordinarily confined in a folded state in an instrument panel. At an emergency, the air bag is inflated to cleave the instrument panel partially so that it may be allowed to expand in front of the passenger.

In the instrument panel, therefore, a portion in front of the air bag device, that is, the portion confronting opening of an air bag case is so formed that it can be cleaved by expansion of the air bag.

The instrument panel is basically constructed by overlaying a solid backing layer of a synthetic resin holding the shape of a instrument panel on the back face of a surface member backed generally with a foaming resin layer. In the instrument panel having the built-in air bag device, a thinned linear portion is formed partially in the surface member in front of the air bag device so that it may be cleaved by the expanding pressure of the air bag.

However, the thinned portion to be cleaved appears as a linear relief on the surface of the instrument panel so that it acts as a parting line to exert a designing restriction on the instrument panel.

SUMMARY OF THE INVENTION

The invention has been conceived in view of the background thus far described and has an object to extend the degree of designing freedom of an instrument panel including a surface member having a two-piece structure of two tones, by making positive use of a joint of the two pieces of the instrument panel as a cleaved portion of an air bag device, and to improve positioning and fitting accuracies and shaping properties at the joint.

In order to achieve the above-specified objects, according to a feature of the invention, there is provided an instrument panel for an air bag device, comprising a surface member, and a foamed member formed on the back side of said surface member, so that the instrument panel may be partially cleaved by expanding pressure of an air bag of the air bag device, confined therein. A cleaved portion is set in an adjoining portion of a plurality of surface components of the surface member, wherein there is formed at adjoining side end portions of the surface components an engaging portion for partial engagement to join the surface components. The engaging portion includes a fitting groove having a generally U-shaped section formed by extending the end portion of one of the surface components to a side of the foamed member, and a fitting protrusion formed by extending the end portion of the other surface component to the side of the foamed member, and adapted to be inserted into the fitting groove, and wherein the foamed member is foamed and shaped with the fitting protrusion being inserted into the fitting groove.

When the instrument panel of the invention is to be manufactured, a process comprises: forming a setting plate to be inserted into the fitting groove of the surface component, such that it can go into and out of the inside of a bottom mold part; fitting said fitting groove on the setting plate while fitting the fitting protrusion of the adjoining surface component in the fitting groove; injecting a foaming material to the back sides of the surface components to foam the foaming material; and retracting the setting plate into the bottom mold part in the foaming course so that the fitting groove and the fitting protrusion may be brought into close contact with each other by the foaming pressure.

Another manufacture process of the invention comprises: inserting the fitting protrusion of the surface component into the fitting groove of the adjoining surface component; temporarily jointing the surface components by spot-fusing the same partially; arranging the temporarily joined surface components on the surface of a bottom mold part; and injecting a foaming material to the back sides of the surface components to foam the foaming material so that the fitting groove and the fitting protrusion may be brought into close contact with each other by the foaming pressure.

Here, the "generally U-shape" should include an upper opened U-shape, V-shape or C-shape.

In the instrument panel of the present invention having the two-piece surface structure of the two tones or different kinds of materials, the joint between the two-piece surface components provides the cleaved portion of the air bag device. This makes it unnecessary to form the thinned portion to be cleaved but possible to improve the degree of freedom for designing the instrument panel.

Moreover, the surface components are joined at their end portions by the fitting groove having the generally U-shaped section and the fitting projection to be fitted in the former. This U-shaped fitting makes it possible to prevent the foaming material from flowing to the mating faces of the joint. Moreover, the foaming pressure of the foaming material can enhance the close contact between the fitting groove and protrusion.

Still moreover, the fitting of the surface components at their end portions facilitates the setting, of the surface components on the mold so that the positioning and fitting accuracies of the joint can be improved.

DESCRIPTION OF THE PREFERRED EMBODIMENTS

Here will be described embodiments of the invention with reference to the accompanying drawings.

Figure 1:
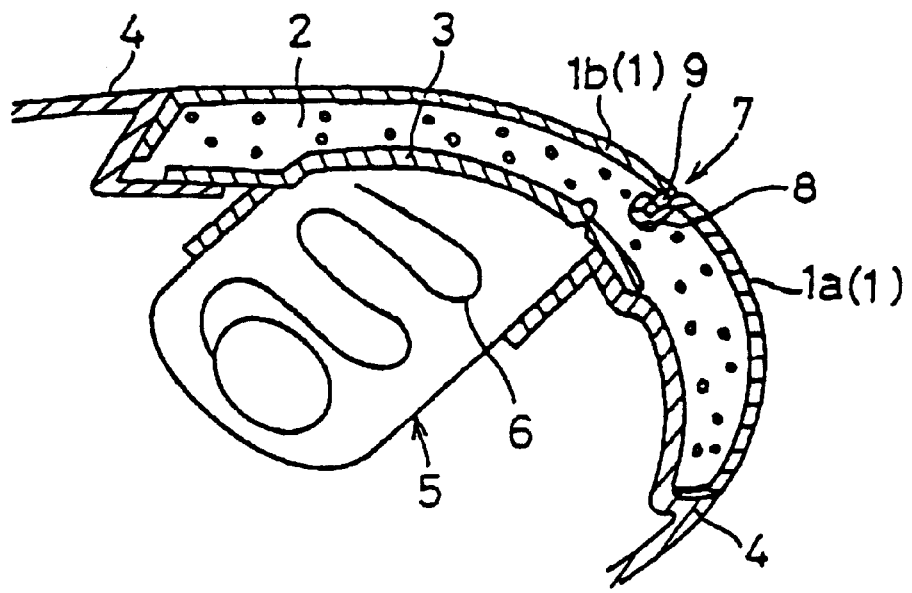
FIG. 1 is a section showing an instrument panel and an air bag device according to an embodiment of the invention.
Figure 2:
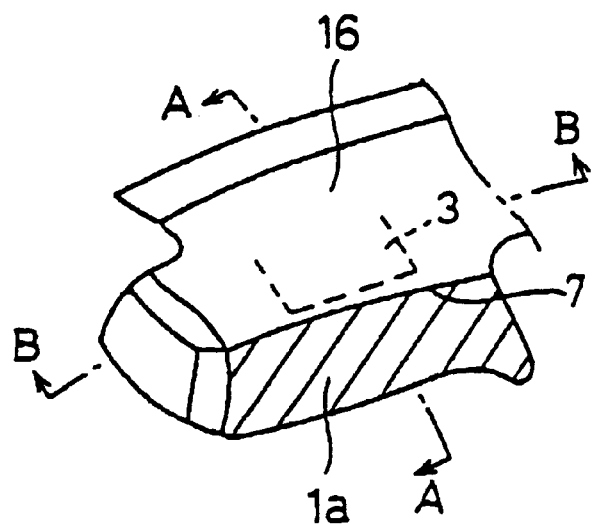
FIG. 2 is a perspective view showing a portion of the instrument panel.
Figure 3:
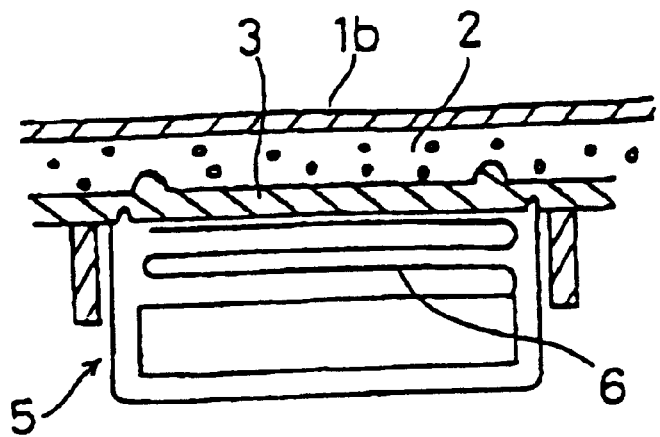
FIG. 3 is a section taken along line B—B of FIG. 2.

FIG. 1 is a section showing an instrument panel and an air bag device according to an embodiment of the invention; FIG. 2 is a perspective view showing a portion of the instrument panel; and FIG. 3 is a section taken along line B—B of FIG. 2. FIG. 1 presents a section taken along line A—A of FIG. 2.

Figure 4:
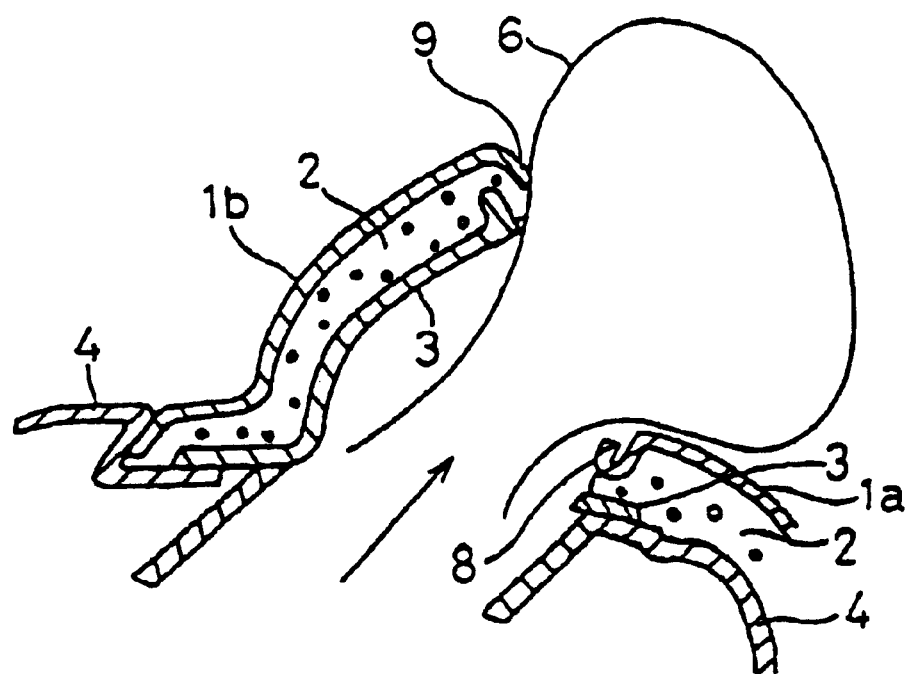
FIG. 4 is a section showing a portion in a state in which the air bag device of the instrument panel is active.

The instrument panel of this embodiment is integrally formed by uniting a foamed member 2 of foaming polyurethane with a back side of a surface member 1 which is made of a thermoplastic resin (or elastomer) such as PVC (polyvinyl chloride), TPO (styrene or olefin) or TPU (urethane). On the back side of the foamed member 2, there are overlaid an air bag door 3 made of aluminum, iron or TPO and a backing member 4 made of a solid resin such as PP (polypropylene), ABS, ASG (acrylic nitrile styrene glass). Thus, the instrument panel is partially cleaved through the air bag door 3, as shown in FIG. 4, by the expanding pressure of an air bag 6 of an air bag device 5, as confined therein.

The portion to be cleaved is set at a portion where there adjoin two kinds of surface components 1a and 1b of different colors arranged vertically separately. At the adjoining side end portion of those surface components 1a and 1b, there is formed an engaging portion 7 where the surface components 1a and 1a are joined by engaging with each other.

This engaging portion 7 is formed to include: a fitting groove 8 having a generally U-shaped section and formed by extending an end portion of the lower surface component 1a to a side of the foamed member 2; and a fitting protrusion 9 which is formed by extending an end portion of the upper surface component 1b likewise to the side of the foamed member 2 and which is fitted in the fitting groove 8.

These fitting groove 8 and protrusion 9 are formed normal to the drawing of FIG. 1 and continuously from a starting end to a terminal end.

With the surface components 1a and 1b having their fitting groove 8 and protrusion 9 engaging with each other, moreover, the foamed member 2 is formed integrally with back sides of the surface components 1a and 1b.

Figure 5:
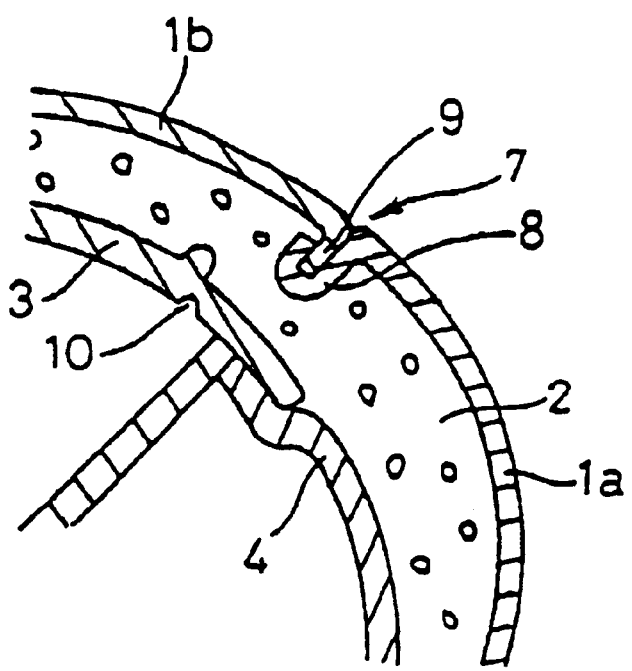
FIG. 5 is an enlarged section showing a joint portion of the instrument panel.

In this air bag device 5 built in the instrument panel, as shown in FIG. 4, the air bag 6 is inflated, when activated, to expand by gas pressure. Then, the air bag door 3, as pushed by the air bag 6, is ruptured at a rupture portion 10, as shown in FIG. 5, so that it cleaves the joint between the surface components 1a and 1b and the foamed member 2 near the junction to allow the air bag 6 to expand to the outside, as shown in FIG. 4.

In this case, the surface member 1 is constructed such that its upper surface component 1b is opened together with the air bag door 3 to the outside. Therefore, the aforementioned cleavage is facilitated by forming the fitting protrusion 9 in the surface component 1b and the U-shaped fitting groove 8 in the lower surface component 1a.

Thus, in the instrument panel of this embodiment, the joint between the two-piece surface components 1a and 1b of the two tones provides the cleaved portion of the air bag device 5. This makes it unnecessary to form a thinned portion to be cleaved as in the prior art but possible to improve the degree of freedom for designing the instrument panel.

Moreover, the surface components 1a and 1b are jointed at their end portions by the fitting groove 8 having the generally U-shaped section and the fitting projection 9 to be fitted in the former. This U-shaped fitting makes it possible to prevent the foaming material from flowing to the mating faces of the joint. Moreover, the foaming pressure of the foaming material can enhance the close contact between the fitting groove 8 and protrusion 9 thereby to prevent the foaming material from oozing out of the joint.

Still moreover, the fitting of the surface components 1a and 1b at their end portions facilitates the setting of the surface components 1a and 1b on a mold so that the positioning and fitting accuracies of the joint can be improved.

Figure 6:
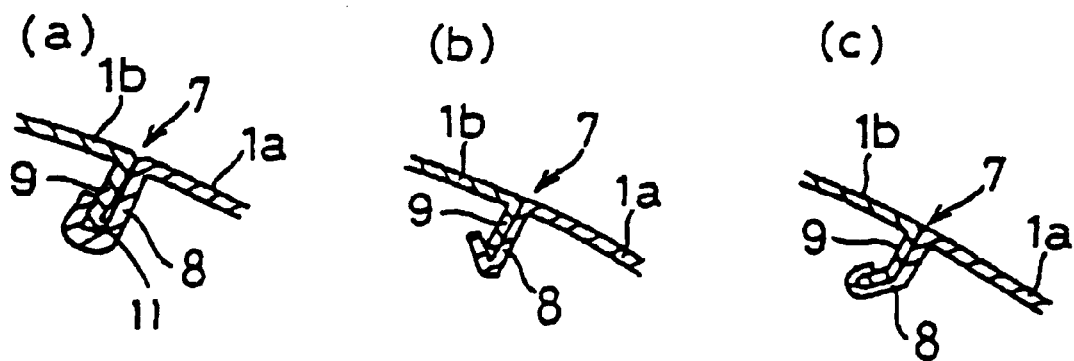
FIGS. 6A to 6C are sections showing individual examples of a fitting groove and a fitting protrusion.

Here, the fitting between the surface components 1a and 1b can be modified by forming a ridge 11 in the thickness direction on the leading end of the fitting protrusion 9, as shown in FIG. 6A, to improve the fitting properties. Alternatively, the sealing properties of the fitting projection and groove 8 with respect to the foaming material can also be improved by forming the fitting groove 8 into a V-shape, as shown FIG. 6B, or by bending both the fitting protrusion 9 and the fitting groove 8 in the thickness direction, as shown in FIG. 6c.

Figure 7:
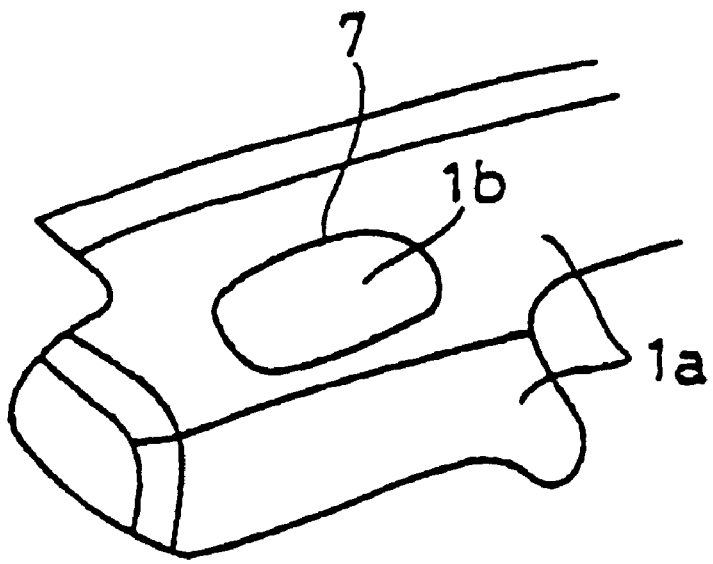
FIG. 7 is a perspective view showing an instrument panel for an air bag device according to another embodiment of the invention.

In another embodiment, on the other hand, there is provided an instrument panel which has outer and inner surface components 1a and 1b adjoining each other, as shown in FIG. 7. In this engaging portion 7, the outer surface component 1a has the (not-shown) U-shaped fitting groove whereas the inner surface component 1b to be opened together with the air bag has the (not-shown) fitting protrusion.

Here will be described a process for manufacturing the instrument panel according to the foregoing embodiments.

Figure 8:
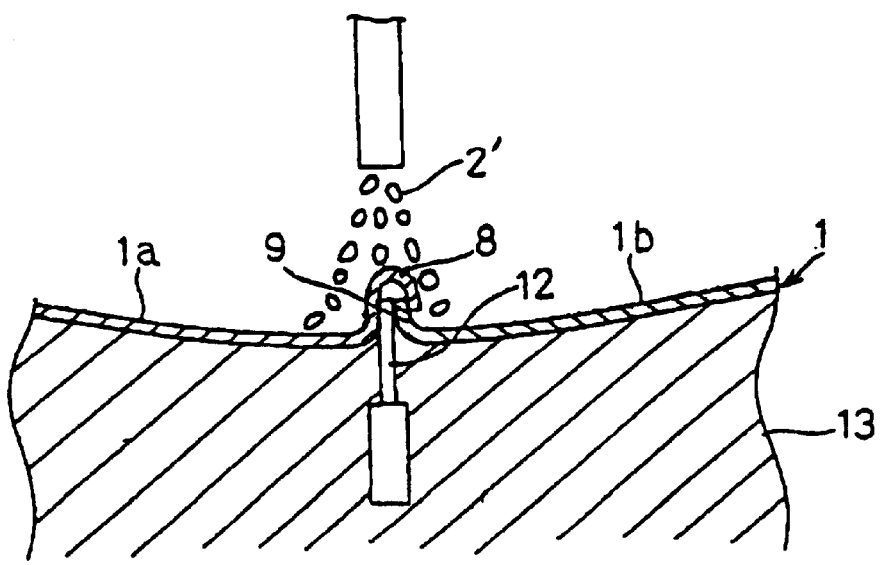
FIG. 8 is a diagram showing a first step of a process for manufacturing an instrument panel according to the first embodiment of the invention.
Figure 9:
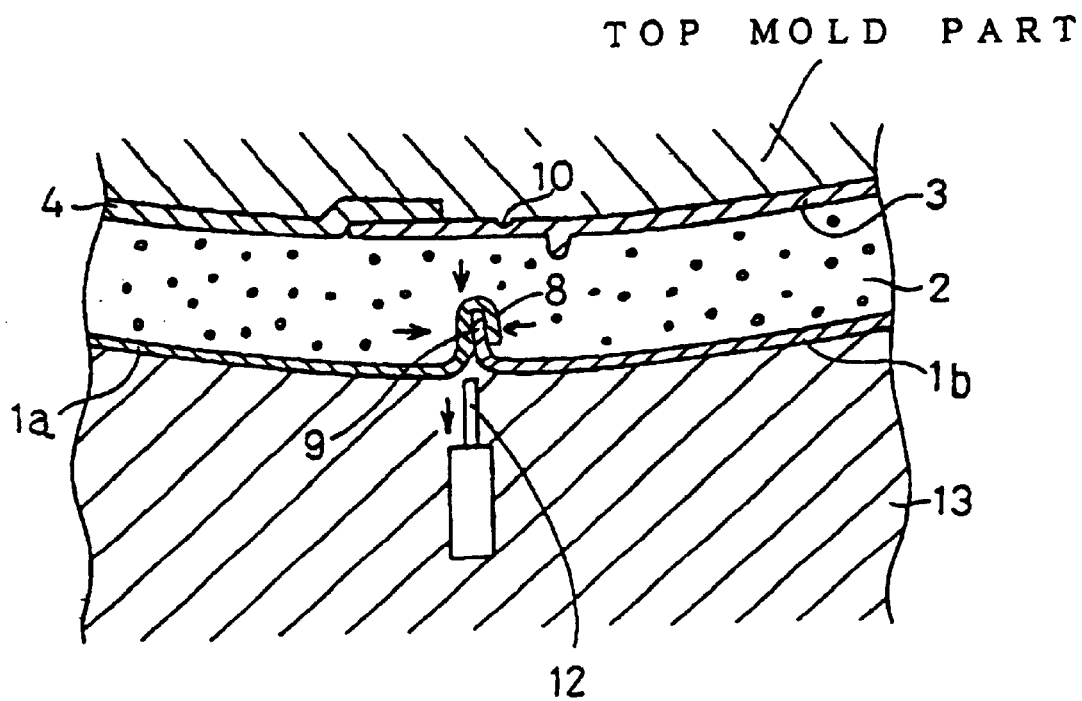
FIG. 9 is a diagram showing a second step of the process.

According to the process, as shown in FIG. 8, a setting plate 12 to be inserted into the fitting groove 8 of the surface component 1a is formed to go into and out of the inside of a bottom mold part 13 of the mold. As shown, the fitting groove 8 is so fitted on the setting plate 12 that it fits the fitting protrusion 9 of the adjoining surface component 1b therein. In this state, a foaming material 2' is injected into and foamed on the back sides of the surface components 1a and 1b. In this foaming course, the setting plate 12 is retracted into the bottom mold part 13 so that the fitting groove 8 and the fitting protrusion 9 can be brought into close contact with each other, as shown in FIG. 9, by the foaming pressure of the foamed member 2.

According to this process, it is possible to accurately position the joint between the surface components 1a and 1b, as will provide the cleaved portion of the air bag device.

Figure 10:
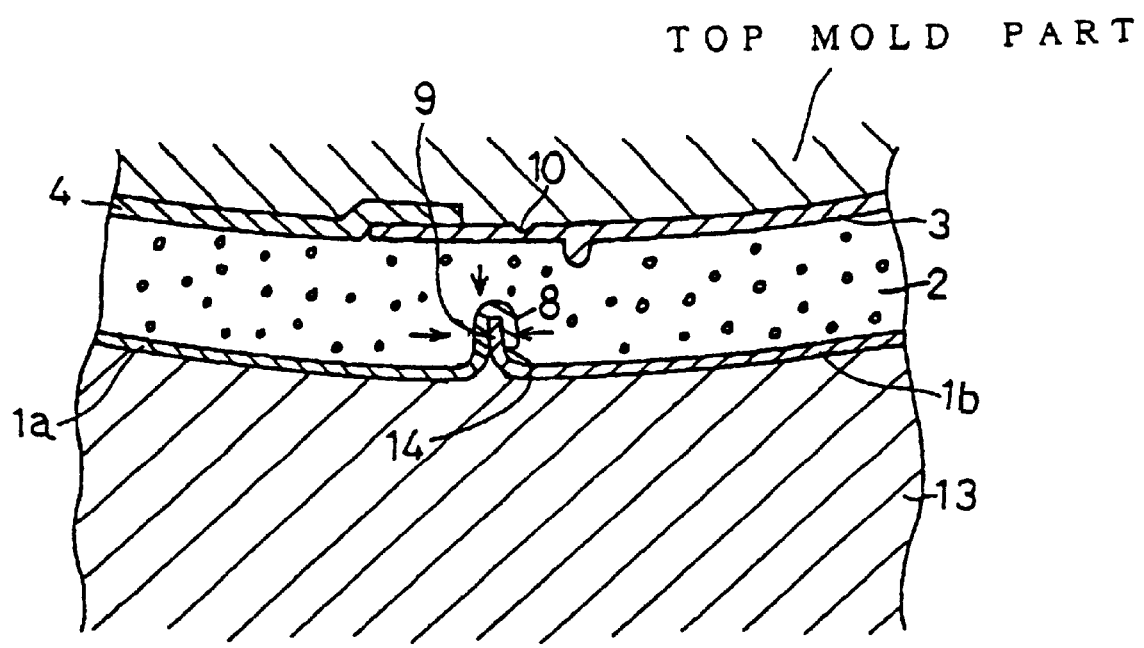
FIG. 10 is a diagram showing a process for manufacturing an instrument panel according to the second embodiment of the invention.

In another manufacture process, as shown in FIG. 10, the fitting protrusion 9 of the surface component 1a is inserted into the fitting groove 8 of the adjoining surface component 1b. These surface components 1a and 1b are temporarily jointed by spot-fusing them partially, as indicated at 14. The surface components 1a and 1b thus temporarily jointed are arranged on the surface of the bottom mold part 13. The foaming material 2' is injected into and foamed on the back sides of the surface components 1a and 1b so that the fitting groove 8 and the fitting protrusion 9 can be brought into close contact with each other by the foaming pressure.

This process can eliminate the setting plate 12, as employed in the foregoing first manufacture process, so that it can simplify the mold and lower the manufacture cost.

ADVANTAGES OF THE INVENTION

In the instrument panel for the air bag device according to the invention, as has been described hereinbefore, the cleaved portion is set in an adjoining portion of a plurality of surface components of the surface member. At the adjoining side end portions of the surface components, there is formed an engaging portion for partial engagement to join the surface components. The engaging portion includes a fitting groove having a generally U-shaped section formed by extending the end portion of one of the surface components to the side of the foamed member, and a fitting protrusion formed by extending the end portion of the other surface component to the side of the foamed member and adapted to be inserted into the fitting groove. The foamed member is foamed and shaped with the fitting protrusion being inserted into the fitting groove. In an instrument panel having a two-piece surface structure of two tones, the joint between the two-piece surface components provides the cleaved portion of the air bag device. This makes it unnecessary to form the thinned portion to be cleaved but possible to improve the degree of freedom for designing the instrument panel. The surface components are joined at their end portions by the fitting groove having the generally U-shaped section and the fitting projection to be fitted in the former. This U-shaped fitting makes it possible to prevent the foaming material from flowing to the mating faces of the joint. Moreover, the foaming pressure of the foaming material can enhance the close contact between the fitting groove and protrusion thereby to prevent the foaming material from oozing out of the joint. Another prominent effect is that the fitting of the surface components at their end portions facilitates the setting the surface components on the mold so that the positioning and fitting accuracies of the joint can be improved.

According to the first instrument panel manufacturing process, the joint of the surface components, in which the positional accuracy is important as the cleaved portion of the air bag device, can be accurately positioned with ease. Moreover, the instrument panel for the air bag device can be manufactured while enhancing the sealing properties of the joint.

According to the second instrument panel manufacturing process, the adjoining surface components are temporarily jointed before the stage at which they are arranged in the mold, by spot-fusing the engaging portion partially at the end portions of the surface components. This joint can improve the handling properties of the surface components which are so thin and poor in shape retention and difficult to handle, that the surface components can be easily set in the mold to improve the production efficiency. This makes it unnecessary to provide the retractable setting plate in the bottom mold part so that the construction of the mold can be simplified to promote the reduction in the production cost.

What is claimed is:

1. A process for manufacturing an instrument panel for an air bag device, comprising the steps of:

providing a surface member having a first surface component and a second surface component each with backsides, said first surface component and said second surface component respectively having first and second side edge portions with respective first and second engaging portions for engaging one another to form an adjoining portion of said surface member whereat said surface member is cleaved by expanding pressure of an air bag, said first engaging portion including opposing side sections and a fitting groove therebetween having a generally U-shaped section extending from said backside of said first surface component, said second engaging portion including a fitting protrusion extending from said backside of said second surface component and adapted to be inserted into said fitting groove;

providing a bottom mold part;

providing a setting plate formed for insertion into the fiting groove of said surface component and movably disposed for insertion into and retraction out of said bottom mold part;

inserting said setting plate into said bottom mold part;

disposing said first surface component and said second surface component into said bottom mold part and fitting said fitting groove on said setting plate while fitting the fitting protrusion in said fitting groove;

injecting a foaming material onto said backsides of said first and second surface components to form a foam member formed as one piece and disposed on and bridging the backsides of said first and second surface components such that said fitting groove with said fitting protrusion inserted therein is embedded in said foam member making said foam member cleavable by the expanding pressure of the air bag of the air bag device when the air bag device is disposed adjacent said foam member; and retracting said setting plate out of the bottom mold part daring the foaming of the foaming material so that said fitting groove and said fining protrusion are brought into close contact with each other by foaming pressure.

2. A process for manufacturing an instrument panel for an air bag device, comprising the steps of:

providing a surface member having a first surface component and a second surface component each with backsides, said first surface component and said second surface component respectively having first and second side edge portions with respective first and second engaging portions for engaging one another to form an adjoining portion of said surface member whereat said surface member is cleaved by expanding pressure of an air bag, said first engaging portion including opposing side sections and a fitting groove therebetween having a generally U-shaped section extending from said backside of said first surface component, said second engaging portion including a fitting protrusion extending from said backside of said second surface component and adapted to be inserted into said fitting groove;

inserting the fitting protrusion of said second surf component into the fitting groove of the first surface component;

temporarily joining said first and second surface components by spot-fusing said first and second engaging portions;

disposing said first and second surface components on a surface of a bottom mold part while temporarily joined; and injecting a foaming material onto the backsides of said first and second surface components to form a foam member formed as one piece and disposed on and bridging the backsides of said first and second surface components such that said fitting groove with said fitting protrusion inserted therein is embedded in said foam member making said foam member cleavable by the expanding pressure of the air bag of the air bag device when the air bag device is disposed adjacent said foam member and so that said fitting groove and said fitting protrusion are brought into close contact with each other by foaming pressure and thereby finally joined.

* * * * *